(12) United States Patent
Lv

(10) Patent No.: US 10,286,559 B2
(45) Date of Patent: May 14, 2019

(54) SELF-MOVING ROBOT AND WALKING METHOD THEREOF

(71) Applicant: Ecovacs Robotics Co., Ltd., Suzhou (CN)

(72) Inventor: Xiaoming Lv, Suzhou (CN)

(73) Assignee: Ecovacs Robotics Co., Ltd., Suzhou (CN)

( * ) Notice: Subject to any disclaimer, the term of this patent is extended or adjusted under 35 U.S.C. 154(b) by 505 days.

(21) Appl. No.: 14/420,287

(22) PCT Filed: Aug. 8, 2013

(86) PCT No.: PCT/CN2013/081086
§ 371 (c)(1),
(2) Date: May 29, 2015

(87) PCT Pub. No.: WO2014/023248
PCT Pub. Date: Feb. 13, 2014

(65) Prior Publication Data
US 2015/0251318 A1    Sep. 10, 2015

(30) Foreign Application Priority Data

Aug. 8, 2012 (CN) .......................... 2012 1 0279763

(51) Int. Cl.
*B25J 11/00* (2006.01)
*B25J 9/00* (2006.01)
(Continued)

(52) U.S. Cl.
CPC ............ *B25J 11/0085* (2013.01); *A47L 1/02* (2013.01); *A47L 9/009* (2013.01); *A47L 11/10* (2013.01);
(Continued)

(58) Field of Classification Search
CPC .......... A47L 11/10; A47L 11/14; A47L 11/28; A47L 11/282; A47L 11/30; A47L 11/302;
(Continued)

(56) References Cited

U.S. PATENT DOCUMENTS 3,614,804 A * 10/1971 Grellsson ................ A47L 9/009
16/21
5,341,536 A * 8/1994 Hill .......................... A47L 11/28
15/22.1
(Continued)

FOREIGN PATENT DOCUMENTS

| CN | 1517188 | 8/2004 |
| CN | 1575722 | 2/2005 |

(Continued)

OTHER PUBLICATIONS

Extended European Search Report, 13828198.5, European Patent Office; 6 pages; dated Apr. 15, 2016.
(Continued)

*Primary Examiner* — Joseph M Rocca
*Assistant Examiner* — Maurice L Williams
(74) *Attorney, Agent, or Firm* — Nixon Peabody LLP

(57) ABSTRACT

A self-moving robot comprises a robot body (1). A control device is provided in the robot body (1), and a functional processing module (11) and a moving module (12) connected to each other are provided in the robot body (1). The moving module (12) is controlled by the control device to drive the functional processing module (11) to conduct mobile processing work in a working space (100). An opening hole (111) is formed inside the functional processing module (11) so that the moving module (12) is arranged rotatably in the opening hole (111) in an embedded manner. The moving module (12) can freely rotates relative to the functional processing module (11) through a connection
(Continued)

mechanism. A walking method of the self-moving robot is further disclosed. The present invention is of simple structure, low cost and significantly improved moving mode, and the cleaning efficiency of the self-moving robot is improved with the same amount of time or power.

15 Claims, 3 Drawing Sheets

(51) Int. Cl.
*A47L 1/02* (2006.01)
*A47L 11/10* (2006.01)
*A47L 11/24* (2006.01)
*A47L 11/40* (2006.01)
*A47L 9/00* (2006.01)
*A47L 11/14* (2006.01)
*A47L 11/30* (2006.01)
*A47L 11/28* (2006.01)

(52) U.S. Cl.
CPC ........... *A47L 11/24* (2013.01); *A47L 11/4061* (2013.01); *B25J 9/0003* (2013.01); *A47L 11/14* (2013.01); *A47L 11/28* (2013.01); *A47L 11/30* (2013.01); *A47L 2201/00* (2013.01); *Y10S 901/01* (2013.01)

(58) Field of Classification Search
CPC .. A47L 11/38; B25J 1/08; B25J 9/0003; B25J 11/008; B25J 11/0085
See application file for complete search history.

(56) References Cited

U.S. PATENT DOCUMENTS

| | | | |
|---|---|---|---|
| 5,432,416 A * | 7/1995 | Tae-Sig | B25J 5/007 318/568.12 |
| 5,440,216 A * | 8/1995 | Kim | A47L 5/28 15/319 |
| 5,720,077 A * | 2/1998 | Nakamura | A47L 11/4061 15/319 |
| 5,815,880 A * | 10/1998 | Nakanishi | A47L 11/20 15/319 |
| 6,119,057 A * | 9/2000 | Kawagoe | G05D 1/0219 15/319 |
| 6,216,312 B1 * | 4/2001 | Rowan | A47L 11/03 15/321 |
| 6,370,453 B2 | 4/2002 | Sommer | |
| 7,346,428 B1 * | 3/2008 | Huffman | A47L 11/24 318/568.1 |
| 7,474,941 B2 | 1/2009 | Kim | |
| 8,099,818 B2 | 1/2012 | Miyake | |
| 9,420,923 B2 | 8/2016 | Woo | |
| 9,483,055 B2 * | 11/2016 | Johnson | G05D 1/0227 |
| 2003/0066160 A1 * | 4/2003 | Meller | A47L 1/02 15/409 |
| 2004/0199301 A1 * | 10/2004 | Woo | G05D 1/0225 701/1 |
| 2006/0143845 A1 * | 7/2006 | Miyake | A47L 1/02 15/103 |
| 2007/0016328 A1 * | 1/2007 | Ziegler | A47L 5/14 700/245 |
| 2008/0195253 A1 * | 8/2008 | Kim | A47L 1/02 700/245 |
| 2008/0209665 A1 * | 9/2008 | Mangiardi | A47L 11/302 15/319 |
| 2008/0276407 A1 * | 11/2008 | Schnittman | A47L 11/34 15/319 |
| 2009/0277476 A1 * | 11/2009 | Hammond | A47L 9/009 134/18 |
| 2010/0228395 A1 * | 9/2010 | Lin | A47L 9/00 700/258 |
| 2012/0126837 A1 * | 5/2012 | Kim | A47L 9/009 324/691 |
| 2012/0151706 A1 | 6/2012 | Seo | |
| 2013/0087393 A1 * | 4/2013 | Vanderstegen-Drake | B62D 55/06 180/9.1 |
| 2013/0096717 A1 * | 4/2013 | Yoon | A47L 11/33 700/245 |

FOREIGN PATENT DOCUMENTS

| | | | | |
|---|---|---|---|---|
| CN | 1688235 A | | 10/2005 | |
| CN | 1864944 | | 11/2006 | |
| CN | 101626873 | | 1/2010 | |
| CN | 101926631 | | 12/2010 | |
| CN | 201782707 | | 4/2011 | |
| CN | 201996468 | | 10/2011 | |
| CN | 102591336 | | 7/2012 | |
| CN | 202751321 | | 2/2013 | |
| EP | 1 559 358 A1 | | 8/2005 | |
| EP | 15282132 | * | 10/2005 | ............. A47L 11/24 |
| EP | 2 462 855 A1 | | 6/2012 | |
| JP | 64-002618 A | | 1/1989 | |
| JP | 07-319542 A | | 12/1995 | |
| JP | 10295604 A | * | 11/1998 | ............. A47L 11/38 |
| JP | 2010102603 | | 5/2010 | |
| JP | 2011161242 A | * | 8/2011 | ............. A47L 5/30 |
| KR | 10-20120004307 | | 1/2012 | |
| KR | 20120004310 A | | 1/2012 | |
| WO | WO 2004/028324 A1 | | 4/2004 | |
| WO | WO-2012005404 A1 | * | 1/2012 | ............. A47L 1/03 |
| WO | WO 2014/023248 | | 2/2014 | |

OTHER PUBLICATIONS

Jichang—practical mechanism design illustrated book, China Machine Press, p. 69, p. 240—Chapter 11 Worm and Worm Wheel Mechanism, 9 pages.
International Search Report, PCT/CN2013/081086, 5 pages, dated Oct. 31, 2013.
International Written Opinion, PCT/CN2013/081086, 11 pages, dated Oct. 31, 2013.

* cited by examiner

SELF-MOVING ROBOT AND WALKING METHOD THEREOF

CROSS-REFERENCE TO RELATED APPLICATIONS

This application is an U.S. national stage of PCT/CN2013/081086, filed on Aug. 8, 2013, which claims priority, to Chinese Patent Application No. 201210279763.5, filed on Aug. 8, 2012, the contents of which are each incorporated herein by reference in its entirety.

FIELD OF THE INVENTION

The present invention relates to a self-moving robot and the walking method thereof and belongs to the technical field of small household appliances manufacture.

BACKGROUND OF THE PRIOR ART

The current moving modes of various self-moving robots are more or less complicated. Taking a glass-wiping robot for example, when running into an obstacle, the glass-wiping robot could move along a required path by repeatedly adjusting its moving direction. Such a process for repeatedly adjusting movement path needs a large amount of adjusting time and the cooperation of an induction mechanism, a control mechanism and a moving mechanism of the robot, which costs lots of energy while taking up lots of work time. Thus, the cleaning efficiency of the robot is greatly reduced.

SUMMARY OF THE INVENTION

In view of the above technical problems in the prior art, the present invention intends to provide a self-moving robot with simple structure, low cost, high sensitivity, strong controllability and significantly improved moving mode. Accordingly, the cleaning efficiency of the self-moving robot is improved with the same amount of time or power.

The technical problems of the present invention are solved through technical solutions as follows.

A self-moving robot comprises a robot body, a control device is provided in the robot body, a functional processing module and a moving module connected to each other are provided on the robot body, the moving module is controlled by the control device to drive the functional processing module to conduct mobile processing work in a working space, an opening hole is formed inside the functional processing module so that the moving module is arranged rotatably in the opening hole in an embedded manner, and the moving module can freely rotates relative to the functional processing module through a connection mechanism.

The connection mechanism provided in the first embodiment of the present invention is a coupling unit comprising a first coupling end provided at the edge of the moving module and a second coupling end provided at the edge of the functional processing module. Each of the first coupling end and second coupling end includes upper and lower coupling joints, wherein a stopping part is provided perpendicularly to the coupling direction at the terminal of the lower coupling joint of the first coupling end, the upper coupling joint of the second coupling end is provided with a stopping groove correspondingly and the stopping part is positioned in the stopping groove in an embedded manner.

In order to enable the moving module to rotate more flexibly relative to the functional processing module, a ball is provided at the central section of the upper coupling joint of the second coupling end, wherein the upper and lower end surfaces of the ball protrude from the upper and lower end surfaces of the upper coupling joint of the second coupling end and are brought into contact with the lower surface of the upper coupling joint and the upper surface of the lower coupling joint of the first coupling end.

Another embodiment of the present invention further provides a connection mechanism which is a roller bearing mechanism provided between the outer edge of the moving module and the inner edge of the opening hole of the functional processing module.

Specifically, the roller bearing mechanism includes an inner ring provided at the outer edge of the moving module, an outer ring provided at the inner edge of the opening hole of the functional processing module and balls between the inner and outer rings.

As required, the moving module is provided with a walking mechanism, and the walking mechanism is driving wheel(s) and corresponding track(s) arranged on the robot body.

The self-moving robot may comprise a variety of functional modules, and different functional modules implement different works. The functional processing module is a glass surface cleaning module, a floor-sweeping module, an air purification module or a humidification module.

In order to facilitate the adsorption of the self-moving robot onto a working surface, a suction device is provided on the moving module, wherein the suction device comprises a suction cup, a gas-guide tube and a vacuum pump, and the vacuum pump is controlled by the control device to communicate with the suction cup through the gas-guide tube and to vacuumize the suction cup to form negative pressure so as to enable the self-moving robot to adhere to a surface to be treated.

To facilitate free rotating of the moving module relative to the functional processing module, the opening hole is a circular opening hole, and the periphery of the functional processing module is of square.

The invention further provides a walking method of the above-mentioned self-moving robot, the method comprising:

step 1: the functional processing module of the self-moving robot is driven by the moving module to move so as to walk in a working space;

step 2: if the self-moving robot detects that there is an obstacle in front of the movement, the self-moving robot continues to walk after the moving module turns a certain angle relative to the functional processing module.

In the step 2, the certain angle is 90 degree.

In conclusion, the self-moving robot according to the present invention is of simple structure, low cost, high sensitivity, strong controllability and significantly improved moving mode. The cleaning efficiency of the self-moving robot is improved with the same amount of time or power.

Hereinafter the technical solution of the present invention will be described in detail in combination with the drawings and some specific embodiments.

DESCRIPTION OF ATTACHED DRAWINGS

DETAILED DESCRIPTION OF PREFERRED EMBODIMENTS

The First Embodiment

Figure 1:
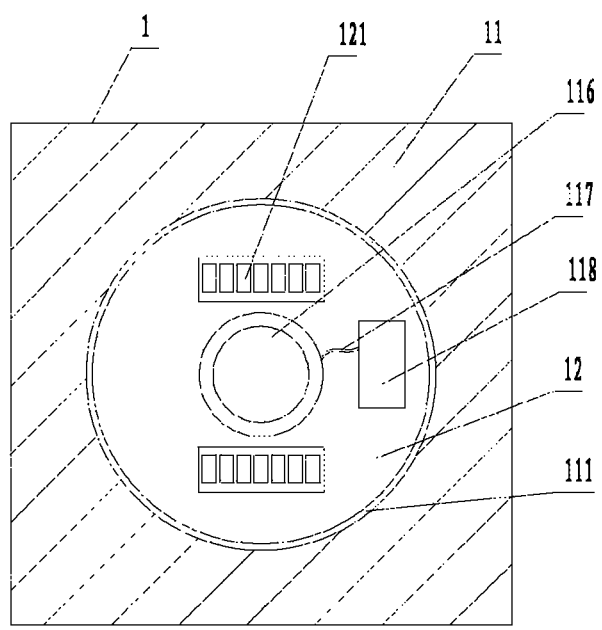
FIG. 1 is a schematic diagram of the overall structure of the first embodiment of the present invention.

FIG. 1 is a schematic diagram of the overall structure of the first embodiment of the present invention. As shown in FIG. 1, the self-moving robot according to the present embodiment is a glass-wiping robot comprising a robot body 1. A control device is provided in the robot body 1, and a functional processing module 11 and a moving module 12 connected to each other are provided in the robot body 1. The moving module 12 is controlled by the control device to drive the functional processing module 11 to conduct mobile processing work in a working space. An opening hole 111 is formed inside the functional processing module 11, and the moving module 12 is arranged rotatably in the opening hole 111 in an embedded manner and rotatably attached to the functional processing module 11 through a connection mechanism. The functional processing module 11 is a glass surface cleaning module.

Furthermore, in the present embodiment, a first coupling end provided at the edge of the moving module 12 and a second coupling end provided at the edge of the functional processing module 11 are included and one of them is inserted into the other for mutual positioning. Specifically, the inner edge of the opening hole 111 of the functional processing module 11 is directly embedded into a recess at the outer edge of the moving module 12, or an outer flange of the moving module is directly inserted into a recess at the inner edge of the opening hole 111 of the functional processing module 11.

As required, the opening hole 111 may be a circular opening hole, and the periphery of the functional processing module 11 is of square. That is to say, the shape of the moving module 12 provided inside of the opening hole 11 is circular, while the shape of the functional processing module 11 outside is square. Such a structure with circular interior and square exterior is a preferable combination manner in shapes of the moving module 12 and the functional processing module 11, which is conducive to spot-turning and walking of the robot. Assuming the external functional processing module 11 is also circular, though the robot can still execute a spot-turning, due to the motion inertia of the circular functional processing module 11 and the moving module 12 which is also circular, such execution is more difficult than that with the structure of the present embodiment. In fact, when the robot needs to turn in a corner position, especially under the effect of resistance of obstacles, the square shape of the functional processing module 11 has appropriate functions in position-limiting and guiding during the spot-turning action of the robot.

Figure 2:
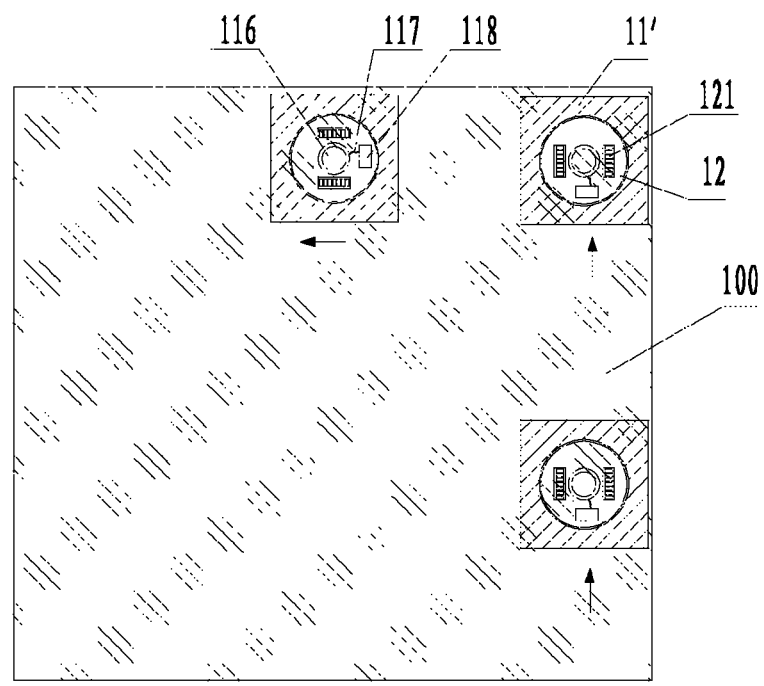
FIG. 2 is a schematic diagram of moving positions of the first embodiment of the present invention.

FIG. 2 is a schematic diagram of walking positions of the first embodiment of the present invention. As shown in FIG. 2, in the present embodiment, the self-moving robot is a glass-wiping robot, and the functional processing module of the self-moving robot is a glass surface cleaning module 11'. A walking method of the glass-wiping robot includes the following steps: step 1: the glass surface cleaning module 11' of the glass-wiping robot is driven by the moving module 12 to move so as to walk on a glass surface 100, and conduct cleaning work on the glass surface 100 at the same time; step 2: if the glass-wiping robot detects that there is an obstacle in the front of the movement, the self-moving robot continues to walk and continuously conduct the cleaning work on the glass surface after the moving module 12 turns 90 degree relative to the glass surface cleaning module 11'.

Referring to FIG. 1, in order to facilitate the walking of the glass-wiping robot, the moving module 12 is provided with a walking mechanism 121, and the walking mechanism 121 is driving wheel(s) and corresponding track(s) provided on the robot body 1. In addition, in order to enable the glass-wiping robot to adhere to the glass surface while working, the moving module 12 is provided with a suction device comprising a suction cup 116, a gas-guide tube 117 and a vacuum pump 118. Under the control of the control device, the vacuum pump 118 communicate with the suction cup 116 through the gas-guide tube 117 and vacuumize the suction cup 116 to form negative pressure so as to enable the glass-wiping robot to adhere to the glass surface during the cleaning work.

In the present embodiment, since the moving module 12 is circular and the inner side of the glass surface cleaning module 11' has a circular hole, the glass surface cleaning module 11' can freely rotates around the moving module 12. In other words, the moving module 12 can freely rotates inside the glass surface cleaning module 11'. When in use, firstly, the robot is vertically pressed against a window; and then the robot is adhered to the glass surface of the window after the vacuum pump 118 is communicated; and then the robot with the cleaning module is driven by the walking mechanism 121 to walk forward and thus achieve window cleaning effect. There is a rotational degree of freedom between the glass surface cleaning module 11' and the moving module 12. Thus, when the glass-wiping robot moves to a corner and turns (arrows indicate walking directions of the robot as shown in FIG. 2), the moving module 12 itself can directly turn an angle of 90 degree, by which the walking method of the robot is greatly improved. Thus, the cleaning efficiency of the glass-wiping robot is improved with the same amount of time or power. Certainly, if the frame of glass window in the present embodiment is a right-angle shape, the moving module 12 can directly turns an angle of 90 degree so as to fulfill a turning action of the robot at a corner when the glass-wiping robot walks to the corner of the frame of glass window. If the frame of glass window or the walking area of the robot is of one of other irregular shapes, the spot-turning action of the robot can still be fulfilled through adopting the technical solution of the present invention to enable the moving module 12 to turn a corresponding angle relative to the functional processing module 11. It is just needed to make a concrete determination about a specific turning angle with the cooperation of other auxiliary devices such as a sensor based on actual requirements. Then a corresponding instruction is issued to fulfill the specific action.

The Second Embodiment

Figure 3:
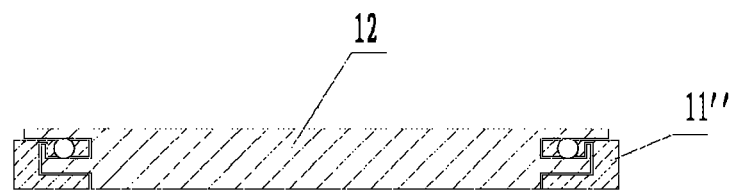
FIGS. 3 and 4 are a sectional view and a partial enlarged view of a ball mechanism of the second embodiment of the present invention respectively.
Figure 4:
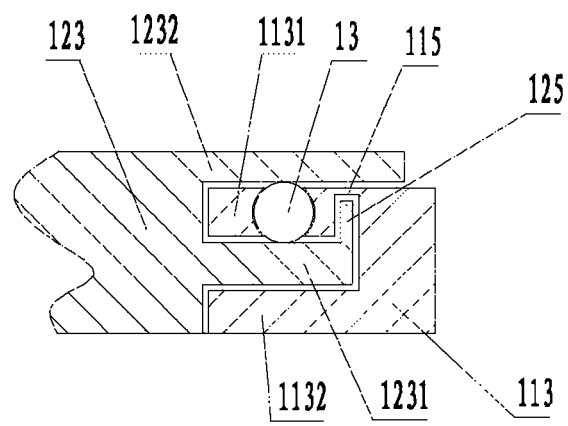

FIGS. 3 and 4 are a sectional view and a partial enlarged view of a ball mechanism of the second embodiment of the present invention respectively. As shown in FIGS. 3 and 4, the present embodiment provides a floor-sweeping robot, and its functional processing module is a floor-sweeping module 11". As shown in FIG. 3, in the present embodiment, in order to facilitate a relative movement between the functional processing module and the moving module 12 as well as reduce wear between the functional processing module and the moving module 12, the connection mechanism is an coupling unit comprising a first coupling end 123 provided at the edge of the moving module 12 and a second coupling end 113 provided at the edge of the floor-sweeping module 11". The first coupling end 123 and the second coupling end 113 are inserted into and positioned with each other, and a gap is remained between the coupling positions thereof. Each of the first coupling end 123 and the second coupling end 113 includes upper and lower coupling joints. A stopping part 125 is provided perpendicularly to the coupling direction at the terminal of the lower coupling joint 1231 of the first coupling end 123 and the upper coupling joint 1131 of the second coupling end 113 is provided with a stopping groove 115 correspondingly. The stopping part 125 is positioned in the stopping groove 115 in an embedded manner.

Referring to FIG. 4, since the connection manner adopted between the functional processing module 11 and the moving module 12 in the first embodiment causes a direct friction between them, easily resulting in the wear on one another. Thus, in order to enable the moving module to rotate more flexibly relative to the functional processing module, a ball 13 is provided at the central section of the upper coupling joint 1131 of the second coupling end 113. The upper and lower end surfaces of the ball 13 protrude from upper and lower end surfaces of the upper coupling joint 1131 of the second coupling end 113 and are brought into contact with the lower surface of the upper coupling joint 1232 and the upper surface of the lower coupling joint 1231 of the first coupling end 123, respectively. The friction between the floor-sweeping module 11" and the moving module 12 is further reduced through the rolling of the ball 13 in the central section of the upper coupling joint 1131 of the second coupling end 113.

The Third Embodiment

Figure 5:
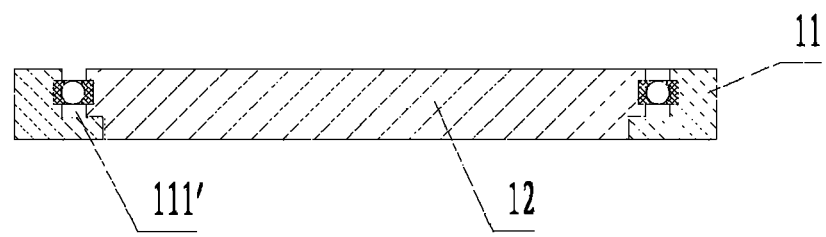
FIGS. 5 and 6 are a sectional view and a partial enlarged view of a roller bearing mechanism of the third embodiment of the present invention respectively.
Figure 6:
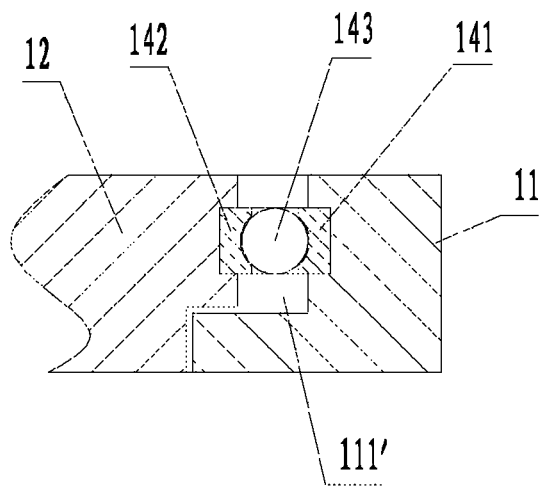

FIGS. 5 and 6 are a sectional view and a partial enlarged view of a roller bearing mechanism of the third embodiment of the present invention respectively. As shown in FIGS. 5 and 6, in order to facilitate the relative movement between the functional processing module 11 and the moving module 12 as well as reduce wear between the functional processing module 11 and the moving module 12, the connection mechanism may also be a roller bearing mechanism provided between the outer edge of the moving module 12 and the inner edge of an opening hole 111' in the functional processing module. As shown in FIG. 6, the roller bearing mechanism includes an inner ring 142 provided at the outer edge of the moving module 12, an outer ring 141 provided at the inner edge of the opening hole 111' in the functional processing module and balls 143 between the inner and outer rings. By replacing the sliding friction between the functional processing module 11 and the moving module 12 with the rolling friction between the balls 143 and the inner ring 142 and the rolling friction between the balls 143 and the outer ring 141, the friction between the functional processing module 11 and the moving module 12 is greatly reduced and the sensitivity of the robot is improved.

The self-moving robot may comprise a variety of functional processing modules 11 and different functional modules 11 take on different works. In addition to the glass-wiping robot and the floor-sweeping robot mentioned in the above embodiments, the functional processing module 11 may be an air purification module, a humidification module and the like.

In conclusion, the self-moving robot according to the present invention is of simple structure, low cost, high sensitivity, strong controllability and significantly improved moving mode. Accordingly, the cleaning efficiency of the self-moving robot is improved with the same amount of time or power.

The invention claimed is:

1. A self-moving robot comprises a robot body (1), a control device is provided in the robot body (1), the robot body (1) comprises a functional processing module (11) and a moving module (12) connected with each other, and the moving module (12) is controlled by the control device to drive the functional processing module (11) to conduct mobile processing work in a working space, characterized in that, an opening hole (111, 111') is formed inside the functional processing module (11) so that the moving module (12) is arranged rotatably in the opening hole (111, 111') in an embedded manner, and the moving module (12) can freely rotate relative to the functional processing module (11) through a connection mechanism, wherein the connection mechanism is a coupling unit comprising a first coupling end (123) provided at an edge of the moving module (12) and a second coupling end (113) provided at an edge of the functional processing module (11), one of the first coupling end (123) and the second coupling end (113) is inserted into the other for mutual positioning, wherein each of the first coupling end (123) and the second coupling end (113) includes upper and lower coupling joints, wherein a stopping part (125) is provided perpendicularly to a coupling direction at a terminal end of the lower coupling joint of the first coupling end (123), the upper coupling joint of the second coupling end (113) is provided with a stopping groove (115) correspondingly, and the stopping part (125) is positioned in the stopping groove (115) in an embedded manner.

2. The self-moving robot of claim 1, further including a ball (13) being provided at a central section of the upper coupling joint of the second coupling end (113), wherein upper and lower end surfaces of the ball (13) protrude from upper and lower end surfaces of the upper coupling joint of the second coupling end (113) and are brought into contact with a lower surface of the upper coupling joint and an upper surface of the lower coupling joint of the first coupling end (123).

3. The self-moving robot of claim 1, characterized in that, the functional processing module (11) is a glass surface cleaning module (11'), a floor-sweeping module, an air purification module or a humidification module.

4. The self-moving robot of claim 1, characterized in that, the moving module (12) is provided with a suction device comprising a suction cup (116), a gas-guide tube (117) and a vacuum pump (118), and the vacuum pump (118) is controlled by the control device to communicate with the suction cup (116) through the gas-guide tube (117) and to vacuumize the suction cup (116) to form negative pressure so as to enable the self-moving robot to adhere to a surface to be treated.

5. The self-moving robot of claim 1, characterized in that, the opening hole (111, 111') is a circular opening hole, and the periphery of the functional processing module (11) is a square shape.

6. A walking method of the self-moving robot of claim 1, the method comprising:

step 1: the functional processing module of the self-moving robot is driven by the moving module to move so as to walk in a working space;

step 2: if the self-moving robot detects that there is an obstacle in front of the movement, the self-moving robot continues to walk after the moving module turns a certain angle relative to the functional processing module.

7. The walking method of the self-moving robot of claim 6, characterized in that, in the step 2, the certain angle is 90 degrees.

8. A self-moving robot comprises a robot body (1), a control device is provided in the robot body (1), the robot body (1) comprises a functional processing module (11) and a moving module (12) connected with each other, and the moving module (12) is controlled by the control device to drive the functional processing module (11) to conduct mobile processing work in a working space, characterized in that, an opening hole (111, 111') is formed inside the functional processing module (11) so that the moving module (12) is arranged rotatably in the opening hole (111, 111') in an embedded manner, and the moving module (12) can freely rotate relative to the functional processing module (11) through a connection mechanism, and the moving module (12) is provided with a walking mechanism (121) that drives the moving module (12) to walk or rotate, wherein the connection mechanism is a coupling unit comprising a first coupling end (123) provided at an edge of the moving module (12) and a second coupling end (113) provided at an edge of the functional processing module (11), one of the first coupling end (123) and the second coupling end (113) is inserted into the other for mutual positioning, wherein each of the first coupling end (123) and the second coupling end (113) includes upper and lower coupling joints, wherein a stopping part (125) is provided perpendicularly to a coupling direction at a terminal end of the lower coupling joint of the first coupling end (123), the upper coupling joint of the second coupling end (113) is provided with a stopping groove (115) correspondingly, and the stopping part (125) is positioned in the stopping groove (115) in an embedded manner.

9. The self-moving robot of claim 8, further including a ball (13) being provided at a central section of the upper coupling joint of the second coupling end (113), wherein upper and lower end surfaces of the ball (13) protrude from upper and lower end surfaces of the upper coupling joint of the second coupling end (113) and are brought into contact with a lower surface of the upper coupling joint and an upper surface of the lower coupling joint of the first coupling end (123).

10. The self-moving robot of claim 8, characterized in that, the walking mechanism (121) is one or more driving wheels and one or more corresponding tracks provided on the robot body (1).

11. The self-moving robot of claim 8, characterized in that, the functional processing module (11) is a glass surface cleaning module (11'), a floor-sweeping module, an air purification module or a humidification module.

12. The self-moving robot of claim 8, characterized in that, the moving module (12) is provided with a suction device comprising a suction cup (116), a gas-guide tube (117) and a vacuum pump (118), and the vacuum pump (118) is controlled by the control device to communicate with the suction cup (116) through the gas-guide tube (117) and to vacuumize the suction cup (116) to form negative pressure so as to enable the self-moving robot to adhere to a surface to be treated.

13. The self-moving robot of claim 8, characterized in that, the opening hole (111, 111') is a circular opening hole, and the periphery of the functional processing module (11) is a square shape.

14. A walking method of the self-moving robot of claim 8, the method comprising:

step 1: the functional processing module of the self-moving robot is driven by the moving module to move so as to walk in a working space;

step 2: if the self-moving robot detects that there is an obstacle in front of the movement, the self-moving robot continues to walk after the moving module turns a certain angle relative to the functional processing module.

15. The walking method of the self-moving robot of claim 14, characterized in that, in the step 2, the certain angle is 90 degrees.

* * * * *